No. 824,739. PATENTED JULY 3, 1906.
H. L. PHELPS.
WEEDLESS FISHING TACKLE.
APPLICATION FILED AUG. 23, 1905.
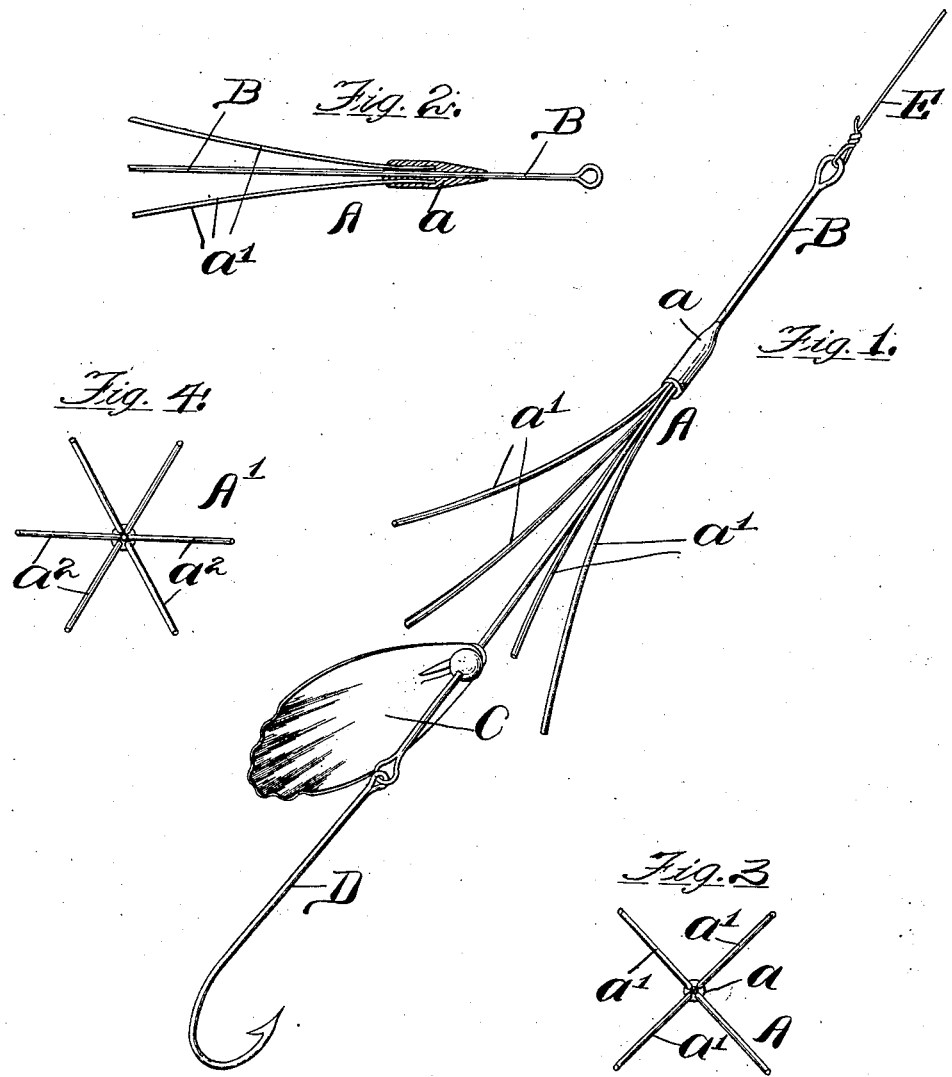

UNITED STATES PATENT OFFICE.

HERBERT L. PHELPS, OF CHICAGO, ILLINOIS.

WEEDLESS FISHING-TACKLE.

No. 824,739.　　　Specification of Letters Patent.　　　Patented July 3, 1906.

Application filed August 23, 1905. Serial No. 275,503.

*To all whom it may concern:*

Be it known that I, HERBERT L. PHELPS, a citizen of the United States of America, and a resident of Chicago, Illinois, have invented a certain new and useful Improvement in Weedless Fishing-Tackle, of which the following is a specification.

My invention relates to hooks, spoons, lures, and other devices which are designed to be secured to the end of a fish-line and which are likely to catch in the weeds. For example, a spoon of the well-known rotary character is likely to become entangled in the weeds and to then refuse to revolve around the wire or stem on which it is mounted, thereby practically destroying its effectiveness as a lure for certain kinds of fish, and the entanglement of a hook in the weeds is of course a thing to be avoided, if possible.

Generally stated, the object of my invention is the provision of an improved, simplified, and highly-efficient arrangement for enabling a fisherman to troll in the weeds with considerably less danger of his hook or tackle becoming entangled in the weeds than would be the case with the ordinary arrangement.

Special objects of my invention are to provide an improved form of guard which can be embodied in the fishing-tackle and which can be employed for guarding either a hook, a spoon, or other devices of the fishing-tackle against becoming entangled in the weeds, to provide a form of guard which will effectively prevent the tackle from becoming entangled in the weeds and which will at the same time accomplish its intended purpose without interfering with the effectiveness or efficiency of the different devices of the fishing-tackle and without frightening away the fish, and to provide certain details and features of improvement tending to increase the general efficiency and serviceability of a weedless fishing-tackle arrangement of this particular character.

To the foregoing and other useful ends my invention consists in matters hereinafter set forth and claimed.

In the accompanying drawings, Figure 1 is a perspective of an ordinary fish-bait arrangement involving a guard embodying the principles of my invention. Fig. 2 is a detail longitudinal section of the said guard. Fig. 3 is an end view of the said guard. Fig. 4 is a view similar to Fig. 3, but showing a guard composed of a larger number of wires.

As thus illustrated, my invention comprises a guard A, composed of a head or hub portion $a$ and a number of wires $a'$. These wires flare or spread in a rearward direction and converge toward and are joined together by the hub $a$, and the said hub can be secured to the stem or wire B, to the rear end of which is secured the rotary spoon C. To the extreme end of the wire B an ordinary fish-hook D or any other suitable hook arrangement can be secured in a well-known manner. The fish-line E may be secured to the other end of the wire B. With this arrangement the artificial fish-bait arrangement can be drawn through the water and even through weedy places with comparatively less danger of either the hook or the spoon becoming entangled in the weeds. The wires $a'$ separate or brush the weeds apart, thereby allowing the spoon and hook to pass without catching or becoming entangled—that is to say, the liability of the tackle becoming entangled in the weeds is precluded or greatly reduced.

In Figs. 1, 2, and 3 the guard consists of only four wires. In Fig. 4, however, the guard A' comprises six wires $a^2$. In this way it will be seen that the guard may comprise as many wires as are necessary for different kinds of tackle and according to the size desired for the guard.

It will be readily understood that my improved guard can be combined with fishing-tackle of any suitable known or approved character. It may be used for merely protecting a lure, such as the spoon shown, or it may be used for protecting a fish-hook. As illustrated, it protects the rotary spoon C, and also of course affords more or less protection for the hook which trails immediately in the rear of the spoon. The spoon C is, it will be seen, a spinner or artificial lure. The same is arranged to rotate upon the wire B at a point immediately in rear of the guard-wires $a'$, which latter have their ends rigidly or fixedly secured to the wire B. Suitable fish-hook means, such as the hook D, are flexibly secured to the end of the wire B at a point in rear of the said spinner.

What I claim as my invention is—

1. In fishing-tackle, the combination of a fish-line E, a straight wire B suitably secured to the end of said line, rearwardly-separating or divergent guard-wires $a'$ having their forward ends rigidly or fixedly secured to the said wire B, and having their outer ends curved outwardly, a spinner or lure rotatably mounted upon the wire B at a point immediately in rear of said guard-wires $a'$, and fish-hook means flexibly secured to the rear end of said wire B, substantially as set forth.

2. In fishing-tackle, a guard for the same, said guard comprising the wires $a'$ secured together at their forward ends and bent outwardly at their rear ends, each wire bent or bowed inwardly between its ends, substantially as and for the purpose set forth.

Signed by me at Chicago, Illinois, this 26th day of July, 1905.

HERBERT L. PHELPS.

Witnesses:
 SARAH LEWIS,
 ALBERT J. SAUSER.